United States Patent Office 3,621,715
Patented Nov. 23, 1971

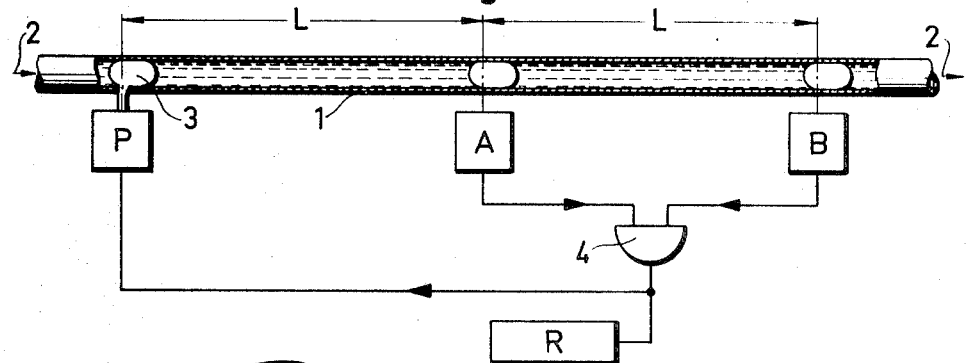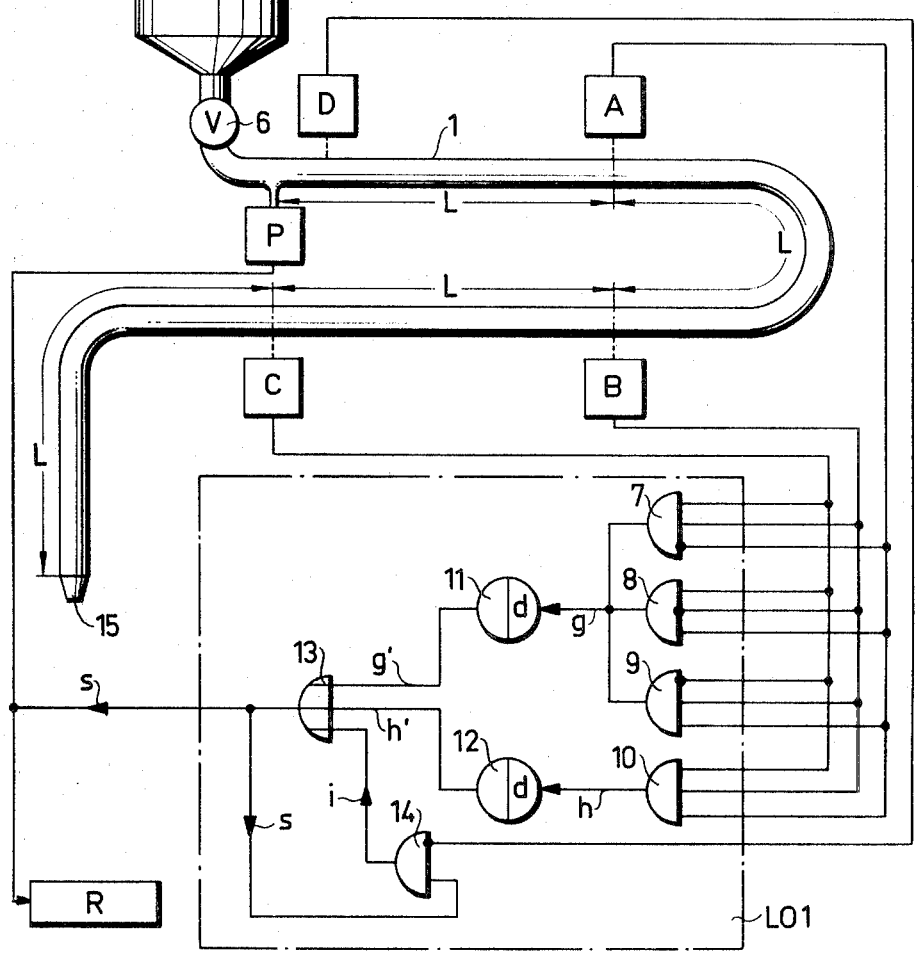

3,621,715
SYSTEM FOR MEASURING THE FLOW
VOLUME OF A LIQUID FLOW
Anton Lars Olof Söderkvist, Vallingby, and Kjell Esbjörn Jidling, Spanga, Sweden, assignors to LKB-Produkter AB, Mariehall, Sweden
Filed Aug. 6, 1969, Ser. No. 848,035
Int. Cl. G01f 3/00
U.S. Cl. 73—194 E 9 Claims

ABSTRACT OF THE DISCLOSURE

A system for measuring the flow volume of a liquid flow comprises a conduit for the liquid flow to be measured and a gas pump connected to this conduit for introducing gas bubbles into the liquid flow in the conduit. The operation of the gas pump is controlled via a logic control circuit from two detectors positioned close to the conduit downstream from the gas pump. Each detector is capable of detecting whether the conduit is filled with gas or liquid in front of the detector and generating an output signal indicating the presence of gas or liquid respectively in the conduit. The first detector is located at a predetermined distance downstream from the gas pump and the second detector is located at a substantially equal distance downstream from the first detector. The logic control circuit is responsive to the output signals from the detectors and produces a control signal for the gas pump to introduce a gas bubble into the liquid flow in the conduit when gas bubbles previously introduced into the liquid flow are detected simultaneously by both detectors. The system includes also a counter for counting the number of gas bubbles introduced into the flow.

---

Figure 3:
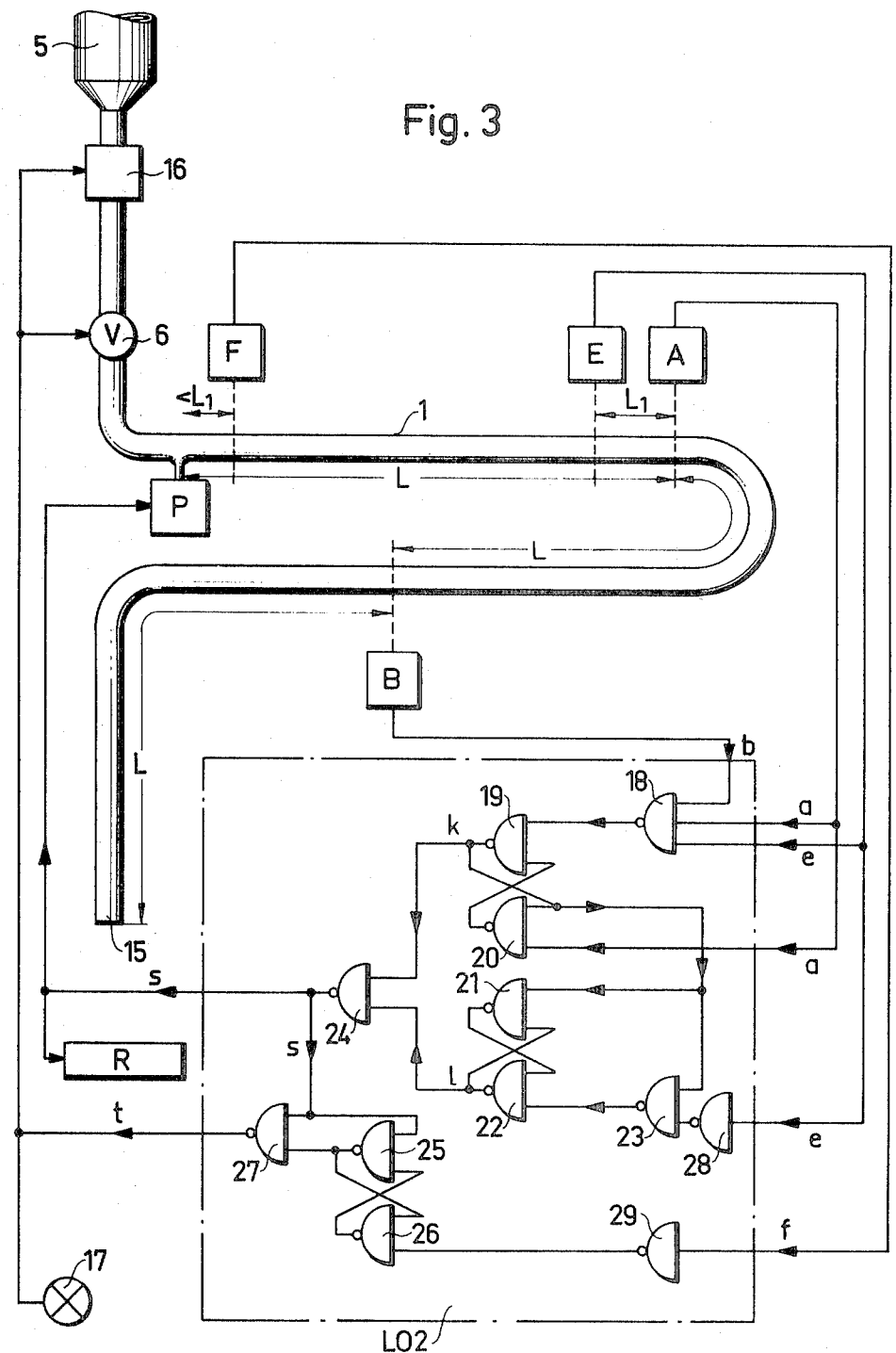

The invention relates to a system for measuring the flow volume or the flow rate of a liquid flow, in particular a liquid flow having a small flow volume and a low flow velocity.

In laboratories, chemical process industries and similar applications it is often required that the flow volume of comparatively small liquid flows with low flow velocities can be determined with high accuracy. This is for instance the case when separation columns, as for instance chromatography or electrophoresis columns, are emptied. After completed separation in such a column the different fractions of the separated sample must generally be transferred to a corresponding number of different test tubes or similar vessels. This is generally performed by means of a fraction collector, in which the different test tubes are positioned and which moves the test tubes sequentially into position under the discharge end of the pipe conduit through which the column is being emptied. In order to obtain the exact desired liquid volumes in the different test tubes it is necessary that the flow volume of the liquid flow from the column is determined accurately and that the fraction collector is controlled in dependency thereof. A large number of various devices and methods for measuring the flow volume of liquid flows for applications of the type discussed in the foregoing are already known in the art. Most of these prior art methods and devices suffer, however, from one or several of following disadvantages: inaccurate for measuring small volumes; unsuitable for measuring large volumes; the measuring result is dependent on the viscosity, the surface tension, the density and/or the temperature of the liquid; causes intermixing between different portions (fractions) of the liquid flow; can not be used for liquids which have a tendency to foam or clog.

A particular system which has been previously suggested for the measuring of the flow volume or flow rate of small liquid flows for applications of the type discussed in the foregoing consists of a pipe conduit for the liquid flow and a gas pump connected to this pipe conduit for introducing gas bubbles into the liquid flow therein. The operation of this gas pump is controlled by a gas-liquid detector, which is positioned close to the pipe conduit dowstream from the gas pump at a predetermined distance therefrom and is capable of detecting the presence of liquid or gas, respectively, in the pipe conduit at the point opposite the detector. This detector activates the gas pump to introduce a new gas bubble into the liquid flow in the pipe conduit every time the detector detects a gas bubble in the conduit. The device includes also a counter for counting the number of gas bubbles introduced into the liquid flow or a timer for measuring the time interval between two subsequent gas bubbles detected by the detector. It is appreciated that the count in the counter will be a measure upon the flow volume of the liquid flow and that the time interval measured by the timer will represent the flow velocity of the liquid flow. A system of this type for measuring the flow volume of a liquid flow is interesting as it is in principle independent of the flow velocity of the liquid flow as well as of the viscosity, the surface tension and the density of the liquid. It can also be used in principle for measuring very small as well as comparatively large flow volumes. Further it does not cause any intermixing between various portions of the liquid flow.

Prior art devices of the above mentioned type suffer, however, from the very serious disadvantage that they are sensitive to disturbances caused by unintentional or random gas bubbles which may be present in the initial liquid flow already before the gas pump. Further, these prior art devices are not capable of starting their operation automatically when the liquid starts to flow through the pipe conduit. The measuring accuracy of the prior art devices is also impaired by variations in the length of the gas bubbles introduced into the liquid flow by the gas pump.

The principal object of the present invention is therefore to provide an improved system of the general type described above for measuring the flow volume of a liquid flow, which system is insensitive to a very high degree to unintentional or random gas bubbles already present in the initial liquid flow.

A further object of the invention is to provide a system of the type mentioned in the foregoing paragraph, which is capable of starting its operation automatically when liquid starts to flow through the pipe conduit of the system.

Still another object of the invention is to provide an improved system of this type, in which the measuring accuracy is not impaired by variations in the length of the gas bubbles introduced into the liquid flow.

The system according to the invention for measuring the flow volume of a liquid flow comprises in its most basic and principal form a pipe conduit for the liquid flow, a gas pump device connected to the pipe conduit for introducing gas into the liquid flow therein in response to a control signal, a first detector means located at a point along the pipe conduit downstream from the gas pump at a predetermined distance therefrom for detecting the presence of gas or liquid, respectively, in the pipe conduit at said point and for generating an output signal having a first value at the detection of gas in the pipe conduit and a second value at the detection of liquid in the pipe conduit, a second detector means similar to said first detector means located at a point along the pipe conduit downstream from the first detector at a distance therefrom substantially equal to the distance between the gas pump and the first detector means a logic control circuit responsive to the output signals from said first and second detector means and adapted to produce a control signal for said gas pump to introduce a limited gas volume into the pipe conduit forming a gas bubble in the liquid flow therein, and a counter responsive to said control signal for counting the number of gas bubbles introduced into the liquid flow in the pipe conduit.

As in the system according to the invention a new gas bubble is introduced into the liquid flow in the pipe conduit by means of the gas pump only when the presence of gas is detected simultaneously at two separate detectors, there is a very small risk for disturbances in the operation of the system caused by unintentional or random gas bubbles present in the liquid flow.

An improved system according to the invention comprises also a third detector similar to the first and second detectors located at a point along the pipe conduit downstream from the second detector at a distance therefrom substantially equal to the distance between the gas pump and the first detector. In this improved system the logic control circuit is responsive to the output signals from all three detectors and adapted to produce the control signal for the gas pump only when the presence of gas is detected simultaneously at at least two of the three detectors and the output signal of at least one of the three detectors changes its value. This improved system according to the invention has the additional advantage that it starts its operation automatically when liquid starts to flow through the pipe conduit.

In another improved and particularly preferred embodiment of the invention the system comprises a third detector similar to the first and second detectors located at a point along the pipe conduit upstream from the first detector at a distance therefrom of the same magnitude as the desired length of the gas bubbles. The logic control circuit is then responsive to the output signals from all three detectors and adapted to start the control signal for the gas pump when said third detector detects liquid after gas having been detected simultaneously at all three detectors and to interrupt the control signal to the gas pump when liquid is thereafter detected by said first detector. Also this embodiment of the invention has the advantage that it starts its operation automatically when liquid starts to flow through the pipe conduit and also the additional and very important advantage that the measuring accuracy is independent of any variations in the length of the gas bubbles introduced into the liquid flow.

Additional characteristic features and advantages of the invention will become clear from the following, in which the invention will be described in detail wth reference to the accompanyng drawing, in which:

FIG. 1 is a schematic diagram illustrating the basic and most simple system according to the invention for measuring the flow volume of a liquid flow;

FIG. 2 is a schematic diagram of an improved and more sophisticated system according to the invention, which is capable of starting its operation automatically and in which the length of the gas bubbles introduced into the liquid flow is maintained substantially constant; and FIG. 3 is a schematic diagram for a particularly preferred and advantageous system according to the invention, which is capable of starting its operation automatically and which is independent to a very high degree to variations in the length of the gas bubbles introduced in the liquid flow and which includes also safety means interrupting the operating of the system upon failure of the gas pump to operate.

The basic system according to the invention illustrated in FIG. 1 includes a pipe conduit 1 for the liquid flow, the volume of which is to be measured. The liquid flows through the conduit 1 in the direction indicated by arrows 2. Adjacent the upstream end of the conduit 1 a gas pump P is connected to the conduit. This pump P is electrically controlled and when affected by a control signal introduces gas, as for instance air, in to the liquid flow in the pipe conduit 1 so that a gas bubble 3 completely filling the cross section of the conduit is formed in the liquid flow. It is appreciated that this gas bubble 3 will move downstream in the pipe conduit with the flow velocity of the liquid flow in the conduit. The control signal for the gas pump P is derived from an and-gate 4 so that the pump P operates and introduces a gas bubble 3 into the liquid flow in the pipe conduit 1 when an output signal appears on the output of this and-gate 4. At a predetermined distance L downstream the conduit 1 from the gas pump P a detector device A is located close to the conduit. The detector A is of a type capable of detecting the presence of gas or liquid, respectively, in the conduit 1 at the point opposite to the location of the detector A and generating an output signal indicating whether the conduit 1 is filled with gas or liquid in front of the detector. The output signal of the detector may have a first value when the conduit is filled with gas opposite the detector and a second value when the conduit is filled with liquid. A second detector device B similar to the first detector device A is located at the distance L downstream from the first detector A. The distance between the pump P and the gas detector A is consequently substantially equal to the distance between the first detector A and the second detector B.

Various types of detectors for detecting the presence of gas or liquid, respectively, at a predetermined point in a liquid conduit are well known in the art. If the walls of the conduit are transparent, such a detector may for instance comprise a light source directing a narrow and well-defined light beam against the conduit and a photocell positioned so as to receive a reflected light beam and thus produce an output voltage when the conduit is filled with gas in front of the light source, whereas no such reflected light beam is received by the photocell and thus no output voltage is produced by the photocell when the conduit is filled with liquid in front of the light source.

The output signals from the detectors A and B are connected as input signals to the and-gate 4. Consequently an output signal from the and-gate 4 is produced only when gas bubbles in the liquid flow in the pipe conduit 1 appear simultaneously in front of both detectors A and B. Thus the gas pump P is activated by the output signal from the and-gate 4 to introduce a new gas bubble 3 into the liquid flow in the conduit 1 when and only when gas bubbles previously introduced into the liquid flow appear simultaneously in front of both detectors A and B.

The system includes also a counter R which is responsive to the output signal from the and-gate 4 and which consequently counts the number of gas bubbles 3 introduced into the liquid flow by the gas pump P. It is appreciated that the total count in the counter R will be a direct measure of the liquid volume that has flown through the conduit 1 from the moment the counter R was started. The counter R may be designed to present or display this result continuously. However, the counter is preferably designed to produce an output signal when the count in the counter reaches a predetermined value and at the sime time to reset itself and start upon a new count. Then the output signal from the counter R can be used for various purposes, as for instance for the control of a fraction collector, for closing a valve interrupting the liquid flow or similar purposes. In such a case the counter may preferably be of a type in which a selected count can be preset and which produces the output signal when this preset count is reached.

It is appreciated that the operation of the flow volume measuring system according to the invention is to a very high extent insensitive to disturbances from any unintentional or random gas bubbles that may be present in the liquid flow already from the beginning, that is before the liquid flow reaches the gas pump P, as the likelihood of two such random gas bubbles appearing simultaneously in front of both detectors A and B is extremely small.

However, the basic system according to the invention illustrated in FIG. 1 has the obvious disadvantage that the measuring operation of the system cannot be started automatically. If the measuring process is to start from a stage with the pipe conduit 1 empty, it is necessary to let the liquid flow into the pipe conduit 1 until the fore end of the liquid column has passed the gas pump P but not yet reached the first detector A, whereafter a manually released control signal must be connected to the pump P so that this is activated to introduce a first gas bubble into the liquid flow in the conduit 1. The supply voltage to the two detectors A and B, however, can not be closed until the fore end of the liquid column in the conduit 1 has passed the first detector A but not yet reached the second detector B. Thereafter, the measuring system will operate automatically.

Another disadvantage in the system according to the invention illustrated in FIG. 1 is that it does not comprise any means for maintaining the length of the gas bubbles constant. As the length of each separate liquid column between two subsequent gas bubbles is equal to L minus the length of the gas bubble in front of the liquid column, it is obvious that any variations in the length of the gas bubbles will give rise to certain errors in the measuring. Further, it is very important that the gas bubbles introduced into the pipe conduit by the gas pump P are sufficiently large to completely fill the cross section of the conduit. Some improvement in this respect could be obtained in the system illustrated in FIG. 1, if a timer circuit was started by the output signal from the and-gate 4 and adapted to produce a control signal of a predetermined constant duration for the gas pump P.

FIG. 2 illustrates schematically an improved flow volume measuring system according to the invention, which starts its measuring operation automatically when the liquid starts to flow through the pipe conduit and in which also the length of the gas bubbles introduced into the liquid flow is maintained substantially constant.

In FIG. 2 this improved system is shown as being used for measuring the liquid volume which is discharged from a vessel 5, as for instance a separation column, through the pipe conduit 1. The vessel 5 is connected to the pipe conduit 1 via a valve 6, which is opened when the vessel 5 is to be emptied. The improved system according to the invention illustrated in FIG. 2 is distinguished from the system illustrated in FIG. 1 essentially therein that it comprises, in addition to the detectors A and B, also a third detector C of the same kind. This third detector C is located downstream from the detector B at a distance L therefrom substantially equal to the distance between the two detectors A and B and the distance between the pump P and the first detector A. The system comprises also a fourth detector D of the same kind, which is located downstream from the gas pump at a distance therefrom corresponding to the desired length of the gas bubbles to be introduced into the liquid flow in the pipe conduit 1. The output signals from the detectors A, B, C, and D are supplied to a logic control circuit L01, which produces the necessary control signal for the gas pump P and the counter R in response to to output signals from the detectors.

The logic control circuit L01 includes four and-gates 7, 8, 9, and 10, each having three inputs connected to each one of the detectors A, B, and C. Each one of the and-gates 7, 8, and 9 has one inverted or negated input. The inverted input of the and-gate 7 is connected to the detector A, whereas the inverted input of the and-gate 8 is connected to the detector B and the inverted input of the and-gate 9 is connected to the detector C. The outputs of the and-gates 7, 8, and 9 are connected to a common point, which is connected to a differentiating circuit 11, whereas the output of the fourth and-gate 10 is connected to a differentiating circuit 12. The differentiating circuits 11 and 12 are of a type that differentiates the leading edge of a signal pulse supplied to the input of the circuit and thus on its output produces a comparatively short signal pulse having a length which is independent of the length or duration of the signal connected to the input of the circuit. The output signals from the differentiating circuits 11 and 12 are connected to each one input of an or-gate 13. This or-gate 13 has also a third input which is connected to the output of an and-gate 14, which has one inverted input connected to the detector D and a normal noninverted input, to which the output signal from the or-gate 13 is connected. The output signal from the or-gate 13 constitutes the output signal of the logic control circuit L01 and thus the control signal for the gas pump P and the counter R.

In the following discussion of the operation of the logic control circuit L01 the output signals from the detectors A, B, C, and D are designated by $a$, $b$, $c$, and $d$, respectively. Also, it is presumed that the output signal of a detector has a 1-value, when the pipe conduit is filled with gas opposite the detector, and a 0-value, when the conduit is filled with liquid opposite the detector. Consequently, the common signal $g$ from the and-gates 7, 8, and 9 has the 1-value, when gas is present in the conduit 1 simultaneously in front of any two of the detectors A, B, and C. Under all other circumstances the signal $g$ has the 0-value. The signal $g'$ on the output of the differentiating circuit 11 assumes the 1-value for a short while when the signal $g$ on the input of the circuit changes from the 0-value to the 1-value. The signal $h$ on the output of the and-gate 10 has the 1-value when the output signals from all detectors A, B, and C have the 1-value, that is when the pipe conduit 1 is filled with gas in front of each one of the detectors A, B, and C. The signal $h'$ on the output of the differentiating circuit 12 assumes the 1-value for a short while when the signal $h$ on the input of the circuit 12 changes from the 0-value to the 1-value. Further, it is presumed that the gas pump P operates and introduces gas into the pipe conduit 1, when the control signal $s$ from the logic control circuit L01 has its 1-value, and that the counter R counts one unit when the signal $s$ assumes its 1-value.

If the measuring process is started with the valve 6 closed and the pipe conduit 1 filled with air, the automatic operation schedule listed in the following Table I is obtained when the valve 6 is opened and the liquid in the vessel 5 is discharged through the pipe conduit 1.

TABLE I

| | Stage | | | | | | | | | |
|---|---|---|---|---|---|---|---|---|---|---|
| | a | b | c | d | g' | h' | i | s | P | R |
| Valve 6 opened, conduit 1 filled with air | 1 | 1 | 1 | 1 | 0 | 0 | 0 | 0 | Unaffected. | Unaffected. |
| Liquid reaches D | 1 | 1 | 1 | 0 | 0 | 0 | 0 | 0 | do. | Do. |
| Liquid reaches A | 0 | 1 | 1 | 0 | ᵃ1 | 0 | 1 | 1 | Starts, introduces 1st bubble. | Counts. |
| 1st bubble reaches D | 0 | 1 | 1 | 1 | 0 | 0 | 0 | 0 | Stops, interrupts 1st bubble. | Unaffected. |
| 1st bubble leaves D | 0 | 1 | 1 | 0 | 0 | 0 | 0 | 0 | Unaffected. | Do. |
| 1st bubble reaches A, liquid has reached B | 1 | 0 | 1 | 0 | ᵃ1 | 0 | 1 | 1 | Starts, introduces 2nd bubble. | Counts. |
| 2nd bubble reaches D | 1 or 0 | 0 | 1 | 1 | 0 | 0 | 0 | 0 | Stops, interrupts 2nd bubble. | Unaffected. |
| 2nd bubble leaves D | 0 | 0 | 1 | 0 | 0 | 0 | 0 | 0 | Unaffected. | Do. |
| 1st bubble reaches B, 2nd bubble reaches A, liquid has reached C | 1 | 1 | 0 | 0 | ᵃ1 | 0 | 1 | 1 | Starts, introduces 3rd bubble. | Counts. |
| 3rd bubble reaches D | 1 or 0 | 1 or 0 | 0 | 1 | 0 | 0 | 0 | 0 | Stops, interrupts 3rd bubble. | Unaffected. |
| 3rd bubble leaves D | 0 | 0 | 0 | 0 | 0 | 0 | 0 | 0 | Unaffected. | Do. |
| 1st bubble reaches C, 2nd bubble reaches B and 3rd bubble reaches A | 1 | 1 | 1 | 0 | 0 | ᵃ1 | 1 | 1 | Starts, introduces 4th bubble. | Counts. |
| 4th bubble reaches D | 1 or 0 | 1 or 0 | 1 or 0 | 1 | 0 | 0 | 0 | 0 | Stops, interrupts 4th bubble. | Unaffected. |
| 4th bubble leaves D | 0 | 0 | 0 | 0 | 0 | 0 | 0 | 0 | Unaffected. | Do. | and so on

ᵃ Short.

As can be seen from the above Table I, the system will start the measuring operation automatically as soon as the valve 6 is opened and the liquid starts to flow through the conduit 1. When the initial starting sequence is over and the liquid flow in the pipe conduit 1 has reached beyond the most downstream detector C and the three first gas bubbles have been introduced into the conduit by means of the pump P, a new gas bubble will be introduced into the conduit each time gas bubbles appear simultaneously in front of all three detectors A, B, C or at least simultaneously in front of two of these three detectors. Consequently, the operation of the system is not disturbed, if occasionally a gas bubble introduced by the pump P into the conduit should be lost or should not activate a detector. It is also appreciated that unintentional or random gas bubbles that may be present in the liquid flow will not disturb the operation of the system, as such random gas bubbles will probably not appear simultaneously in front of at least two of the three detectors A, B, C. The operation of the gas pump P is stopped in response to the output signal from the additional detector D, whereby each gas bubble introduced into the pipe conduit will have a length substantially corresponding to the distance between the pump P and the detector D. In this way the length of the gas bubbles is maintained substantially constant. The counter R counts one unit for each gas bubble introduced into the pipe conduit 1 by the pump P.

In order to obtain that the liquid volume being discharged from the open discharge end 15 of the pipe conduit 1 during a given time interval corresponds exactly to the count accumulated in the counter 3 during the same time interval, the length of the pipe conduit 1 between its open discharge end 15 and the most downstream detector C shall be substantially equal to the distance L between the detectors or to any other integer multiple of this distance L.

Although the system illustrated in FIG. 2 constitutes a major improvement as compared to the simple basic system illustrated in FIG. 1, this improved system still has some disadvantages. As a matter of fact it is difficult to maintain the length of the gas bubbles introduced into the pipe conduit entirely constant and thus to obtain a high measuring accuracy. The reason for this is that the pump P must introduce the gas into the pipe conduit 1 under a certain pressure, which is sufficient for stopping the liquid flow from the vessel 5 past the pump P. When the pump P is stopped and interrupts the introduction of gas into the pipe conduit 1, the gas bubble just introduced into the conduit will consequently expand and obtain a length which is somewhat longer than the distance between the pump P and the detector D. The actual resulting length of the gas bubble is difficult to maintain constant from one gas bubble to another, and as the length of the liquid column between two subsequent gas bubbles is equal to L minus the length of the gas bubble in front of the liquid column, the measuring accuracy is also in this improved system impaired by any variations in the length of the gas bubbles. Further, the system illustrated in FIG. 2 will not automatically stop its operation upon failure of the gas pump P to operate. Upon such a failure of the gas pump to operate in the intended manner the system should preferably automatically stop its operation and give an indication thereof. The sensitivity to disturbing bubbles may further be decreased.

FIG. 3 illustrates schematically another and particularly preferred embodiment of the invention, which does not have the above discussed disadvantages of the system illustrated in FIG. 2.

The improved system in FIG. 3 is shown as being used for measuring the liquid volume being discharged from a vessel 5 through the pipe conduit 1. The vessel 5 is connected to the conduit 1 through the valve 6 and a flow pump 16. In this improved system the valve 6 and the flow pump 16 are electrically controlled from the logic control circuit L02 of the system. As compared with the simple basic system according to the invention illustrated in FIG. 1 the improved system in FIG. 3 is distinguished essentially in that it comprises a third detector E of the same type as the first and second detectors A and B. This third detector E is located upstream from the first detector A at a distance $L_1$ therefrom of the same magnitude as the desired length of the gas bubbles being introduced into the pipe conduit 1. The system includes also an additional fourth detector F of the same kind, which is located downstream from the pump P at a distance therefrom which is shorter than the distance $L_1$ between the detectors A and E.

The output signals from the detector A, B, E and F are supplied to the logic control circuit L02, which in response to these signals produces the necessary control signal $s$ for the gas pump P and the counter R as well as the necessary control signal $t$ for the flow pump 16 and the valve 6. This signal $t$ is also supplied to an indicator lamp 17, which when lighted indicates that the system is in operation.

The logic control circuit L02 consists of ten nand-gates 18 to 27 and two inverters 28, 29. As the operation of these logic circuit elements is well known in the art and the mutual interconnection of the elements is clearly illustrated in FIG. 3, a detailed description of the operation of the logic control circuit L02 should not be necessary.

In the following description of the operation of the system illustrated in FIG. 3 the output signals from the detectors A, B, E, and F are designated with $a$, $b$, $e$, and $f$, respectively. As illustrated in FIG. 3 the output signal from the nand-gate 19 is designated with $k$ and the output signal from the nand-gate 22 with $l$. As in the foregoing it is presumed that the output signal from a detector has its 1-value, when the pipe conduit 1 is filled with gas in front of the detector, and its 0-value, when the pipe conduit is filled with liquid in front of the detector. The flow pump 16 is presumed to operate and the valve 6 to be open when the output signal $t$ from the nand-gate 27 in the logic control circuit L02 has the 1-value. Then the "in-operation" lamp 17 is also lighted. If the signal $t$ assumes the 0-value, the flow pump 16 is stopped and the valve 6 closed at the same time as the lamp 17 becomes extinguished. The gas pump P is in operation when the output signal $s$ from the nand-gate 24 in the logic control circuit L02 has its 0-value and correspondingly the counter R counts one unit when the signal $s$ assumes its 0-value.

If the flow volume measuring system in FIG. 3 is started from a state, in which the flow pump 16 is standing still, the valve 6 is closed and the pipe conduit 1 is filled with air, an automatic operation schedule as listed in the following Table II is obtained, when supply voltage is connected to the detectors and the electric control circuits of the system. When studying this table it should be kept in mind that, as explained in the foregoing, a gas bubble introduced into the liquid flow in the pipe conduit 1 by the gas pump P will expand and obtain a somewhat larger length when the operation of the gas pump is interrupted. Consequently, the gas bubbles introduced by the gas pump P into the liquid flow in the pipe conduit 1 will have a length somewhat exceeding the distance $L_1$ between the detectors A and E.

the length of the gas bubbles can not impair the measuring accuracy.

As seen from the Table II, the output signal $t$ from logic control circuit L02 has continuously and uninterrupted the 1-value during the operation of the system, which means that the flow pump 16 is maintained in operation and the valve 6 is maintained open. The signal $t$ can assume the 0-value, whereby the flow pump 16 is stopped and the valve 6 is closed, only under one condition. If the signal $s$ has its 0-value, meaning that pump P should be operating and introducing gas into the pipe conduit 1, and the signal $f$ has its 0-value, meaning that liquid is present in the conduit 1 in front of the detector F, and the signal $s$ changes to its 1-value, this causes the signal $t$ to change to its 0-value, thereby stopping the operation of the flow pump 16 and closing the valve 6 so that the entire measuring operation is stopped. Such a condition can appear only if the gas pump P should fail to start under the influence of the signal $s$ so that no gas is introduced into the pipe conduit 1 and liquid reaches the detector A before any gas has reached the detector F. Consequently, in the event of failure of the gas pump P to operate as required under the control of the signal $s$ the system will automatically stop the measuring operation by stopping the flow pump 16 and closing the valve 6. The interruption of the operation of the system is indicated by the lamp 17, which becomes extinguished.

Also in the system illustrated in FIG. 3 the stipulations discussed in the foregoing are valid for the length of the pipe conduit 1 between its open discharge end 15 and the most downstream detector B.

What is claimed is:

1. A system for measuring the flow volume of a liquid

TABLE II

| | Stage | | | | | | | | | |
|---|---|---|---|---|---|---|---|---|---|---|
| | e | a | b | f | k | l | s | t | P | R | Flow pump 16; Valve 6 |
| Supply voltage on, conduit 1 filled with air | 1 | 1 | 1 | 1 | 1 | 0 | 1 | 1 | Unaffected | Unaffected | Pump 16 starts; valve 6 opens. |
| Liquid reaches F | 1 | 1 | 1 | 0 | 1 | 0 | 1 | 1 | do | do | Pump 16 and valve remain in operation and open resp. |
| Liquid reaches E | 0 | 1 | 1 | 0 | 1 | 1 | 0 | 1 | Starts, introduces 1st bubble | Counts | Do. |
| 1st bubble reaches F | 0 | 1 | 1 | 1 | 1 | 1 | 0 | 1 | Operates | Unaffected | Do. |
| Liquid reaches A | 0 | 0 | 1 | 1 | 0 | 0 | 1 | 1 | Stops, interrupts 1st bubble | do | Do. |
| 1st bubble leaves F | 0 | 0 | 1 | 0 | 0 | 1 | 1 | 1 | Unaffected | do | Do. |
| 1st bubble reaches E | 1 | 0 | 1 | 0 | 0 | 0 | 1 | 1 | do | do | Do. |
| 1st bubble reaches A | 1 | 1 | 1 | 0 | 1 | 0 | 1 | 1 | do | do | Do. |
| Liquid reaches E (rear end of 1st bubble) | 0 | 1 | 1 | 0 | 1 | 1 | 0 | 1 | Starts, introduces 2nd bubble | Counts | Do. |
| 2nd bubble reaches F | 0 | 1 | 1 | 1 | 1 | 1 | 0 | 1 | Operates | Unaffected | Do. |
| Liquid reaches B | 0 | 1 | 0 | 1 | 1 | 1 | 0 | 1 | do | do | Do. |
| Liquid reaches A (rear end of 1st bubble) | 0 | 0 | 0 | 1 | 0 | 0 | 1 | 1 | Stops, interrupts 2nd bubble | do | Do. |
| 2nd bubble leaves F | 0 | 0 | 0 | 0 | 0 | 0 | 1 | 1 | Unaffected | do | Do. |
| 2nd bubble reaches E | 1 | 0 | 0 | 0 | 0 | 0 | 1 | 1 | do | do | Do. |
| 1st bubble reaches B | 1 | 0 | 1 | 0 | 0 | 0 | 1 | 1 | do | do | Do. |
| 2nd bubble reaches A | 1 | 1 | 1 | 0 | 1 | 0 | 1 | 1 | do | do | Do. |
| Liquid reaches E (rear end of 2nd bubble) | 0 | 1 | 1 | 0 | 1 | 1 | 0 | 1 | Starts, introduces 3rd bubble | Counts | Do. |
| 3rd bubble reaches F | 0 | 1 | 1 | 1 | 1 | 1 | 0 | 1 | Operates | Unaffected | Do. |
| Liquid reaches B (rear end of 1st bubble) | 0 | 1 | 0 | 1 | 1 | 1 | 0 | 1 | Operates | Unaffected | Do. |
| Liquid reaches A (rear end of 2nd bubble) | 0 | 0 | 0 | 1 | 0 | 0 | 1 | 1 | Stops, interrupts 3rd bubble | do | Do. |
| 3rd bubble leaves F | 0 | 0 | 0 | 0 | 0 | 0 | 1 | 1 | Unaffected | do | Do. | and so on

As can be seen from this Table II, the system will automatically start the flow pump 16 and open the valve 6 for the liquid flow through the pipe conduit 1 and thereafter start the measuring operation. The gas pump P is started for introducing a new gas bubble into the liquid flow, when liquid reaches the detector E, provided that before that the presence of gas has been detected simultaneously in front of all three detectors E, A, and B. Thereafter the pump P is stopped and the introduction of the new gas bubble interrupted, when the liquid reaches the detector A. It is appreciated that according to this operation program, a new gas bubble will be introduced only when the presence of a gas bubble has been detected simultaneously in front of the detectors E and A as well as in front of the detector B, and that the length of the liquid column between two subsequent gas bubbles is always equal to the distance $L-L_1$ independent of the length of the gas bubbles. Consequently, variations in flow, comprising a pipe conduit for said liquid flow, a gas pump device connected to said pipe conduit for introducing gas into the liquid flow therein in response to a control signal, first detector means located at a point along said pipe conduit downstream from said pump device for detecting the presence of gas or liquid in said pipe conduit at the location of said detector means and for generating an output signal having a first value upon detection of gas and a second value upon detection of liquid, second detector means similar to said first detector means located at a point along said pipe conduit downstream from said first detector means at a distance therefrom substantially equal to the distance between said gas pump device and said first detector means, a logic control circuit responsive to the output signals of said first and second detector means for initiating generation of a control signal for said gas pump device to introduce a limited volume of gas into said pipe conduit forming a gas bubble in the liquid flow therein upon detection of gas in said pipe conduit simultaneously at both said first and second detector means, and counting means responsive to said control signal for counting the number of gas bubbles introduced into the liquid flow in said pipe conduit.

2. A system as claimed in claim 1, wherein said control signal has a predetermined constant duration.

3. A system as claimed in claim 1, wherein said pipe conduit has a discharge end for said liquid flow located downstream from said second detector means at a distance therefrom substantially equal to an integer times the distance between said pump device and said first detector means.

4. A system for measuring the flow volume of a liquid flow, comprising a pipe conduit for said liquid flow, a gas pump device connected to said pipe conduit for introducing gas into the liquid flow therein in response to a control signal, first detector means located at a point along said pipe conduit downstream from said pump device for detecting the presence of gas or liquid in said pipe conduit at the location of said detector means and for generating an output signal having a first value upon detection of gas and a second value upon detection of liquid, second detector means similar to said first detector means located at a point along said pipe conduit downstream from said first detector means at a distance therefrom substantially equal to the distance between said gas pump device and said first detector means, third detector means similar to said first and second detector means located at a point along said pipe conduit downstream from said second detector means at a distance therefrom substantially equal to the distance between said pump device and said first detector means, a logic control circuit responsive to the output signals of said first, second and third detector means for initiating the generation of a control signal for activating said gas pump device to introduce a limited volume of gas into said pipe conduit forming a gas bubble in the liquid flow therein when gas is detected simultaneously by at least two of said first, second and third detector means and the output signal of at least one of said first, second and third detector means changes its value, and counting means responsive to said control signal for counting the number of gas bubbles introduced into the liquid flow in said pipe conduit.

5. A system as claimed in claim 4, comprising a fourth detector means similar to said first, second and third detector means located at a point along said pipe conduit downstream from said gas pump device at a distance therefrom substantially corresponding to the desired length of the gas bubbles to be introduced into the liquid flow in said pipe conduit, and wherein said logic control circuit comprises means responsive to the output signal of said fourth detector means for interrupting said control signal upon detection of gas by said fourth detector means.

6. A system as claimed in claim 4, wherein said pipe conduit has a discharge end located downstream from said third detector means at a distance therefrom substantially equal to an integer times the distance between said gas pump device and said first detector means.

7. A system for measuring the flow volume of a liquid flow, comprising a pipe conduit for said liquid flow, a gas pump device connected to said pipe conduit for introducing gas into the liquid flow therein in response to a control signal, first detector means located at a point along said pipe conduit downstream from said pump device for detecting the presence of gas or liquid in said pipe conduit at the location of said detector means and for generating an output signal having a first value upon detection of gas and a second value upon detection of liquid, second detector means similar to said first detector means located at a point along said pipe conduit downstream from said first detector means at a distance therefrom substantially equal to the distance between said gas pump device and said first detector, third detector means similar to said first and second detector means located at a point along said pipe conduit upstream from said first detector means at a distance therefrom of the same magnitude as the desired length of gas bubbles to be introduced into said liquid flow by said gas pump device, a logic control circuit responsive to the output signals of said first, second and third detector means for initiating the generation of a control signal for activating said gas pump device to introduce gas into the liquid flow in said pipe conduit upon detection of liquid by said third detector means subsequent to a simultaneous detection of gas by all said first, second and third detector means and for interrupting said control signal upon a subsequent detection of liquid by said first detector means, and counting means responsive to said control signal for counting the number of gas bubbles introduced into the liquid flow in said pipe conduit.

8. A system as claimed in claim 7, comprising flow control means located upstream from said gas pump device and activatable to shut off the liquid flow through said pipe conduit, and fourth detector means similar to said first, second and third detector means located at a point along said pipe conduit downstream from said gas pump device at a distance therefrom less than the distance between said first and said third detector means, and wherein said logic control circuit comprises means responsive to said control signal and the output signal of said fourth detector means for activating said flow control means to shut off said liquid flow if said fourth detector means fails to detect gas during the duration of said control signal.

9. A system as claimed in claim 7, wherein said pipe conduit has a discharge end located downstream from said second detector means at a distance therefrom substantially equal to an integer times the distance between said gas pump device and said first detector means.

References Cited
UNITED STATES PATENTS

| | | | |
|---|---|---|---|
| 2,724,271 | 11/1955 | Shawhan et al. | 73—204 |
| 3,403,554 | 10/1968 | Chevalier et al. | 73—194 |
| 3,403,555 | 10/1968 | Versaci et al. | 73—194 |

RICHARD C. QUEISSER, Primary Examiner

H. GOLDSTEIN, Assistant Examiner